(No Model.)
E. ARAPIAN.
SPONGE FISHING NET.
No. 255,561. Patented Mar. 28, 1882.
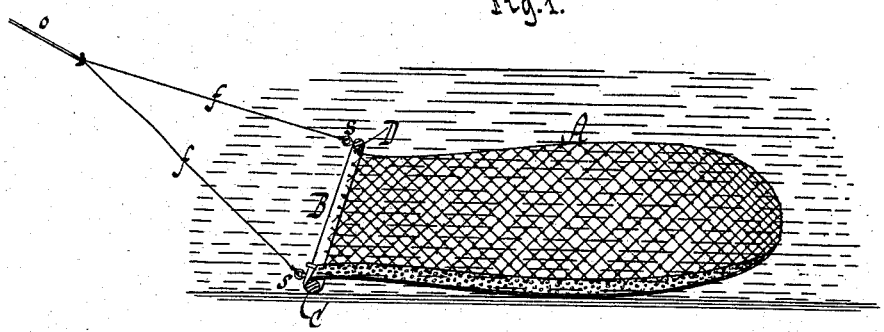
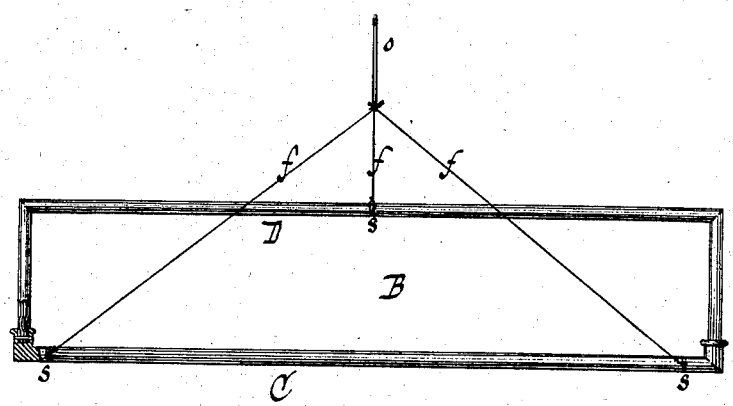
WITNESSES:
Otto Hafeland
William Miller
INVENTOR
Edward Arapian
BY Van Santvoord & Hauff
ATTORNEYS

UNITED STATES PATENT OFFICE.

EDWARD ARAPIAN, OF NEW YORK, N. Y., ASSIGNOR TO HIMSELF AND BASILIOS KIRIAKO MOSCOPULOS, OF SAME PLACE.

SPONGE-FISHING NET.

SPECIFICATION forming part of Letters Patent No. 255,561, dated March 28, 1882.

Application filed February 14, 1882. (No model.)

*To all whom it may concern:*

Be it known that I, EDWARD ARAPIAN, a citizen of the United States, residing at New York, in the county and State of New York, have invented new and useful Improvements in Sponge-Fishing Nets, of which the following is a specification.

The object of this invention is to produce a net adapted especially to the purpose of fishing sponges; and it consists in a net of bag shape, having attached to the mouth thereof a frame one portion of which is composed of metal or other heavy material and the remainder of wood or other buoyant material, so that when the net is cast into the water the heavy portion of the frame acts as a sinker, while the buoyant portion thereof has a tendency to float, whereby the mouth of the net is kept open for the reception of the sponges or other objects or substances.

This invention is illustrated in the accompanying drawings, in which Figure 1 represents a longitudinal central section. Fig. 2 is a front view.

Similar letters indicate corresponding parts.

The letter A designates the net, which is made in the shape of a bag, and B the frame attached to the mouth of the net. In the example shown this frame is rectangular; but the shape thereof can be varied as circumstances or the views of constructers may render expedient.

C indicates the heavy or weighty portion of the frame, composed of metal or other similar material, and D the buoyant portion thereof, composed of wood or the like, the heavy portion forming one side and the buoyant portion the remainder of the frame. The said two portions of the frame B are fastened together by rivets or screws; but other means can be readily devised and used for this purpose.

In applying the net to use I attach to the frame a sling, *f*, as by staples *s*, for the connection of a drag-rope, *o*. It will be perceived that when the net is thrown into the water the weighty portion C of the frame sinks to the bottom, while the buoyant portion D at the same time tends to rise or float, and it follows that the mouth of the net is held open to its full extent, so that whatever objects or substances are met with by the net in the water are received or caught therein without danger of escaping.

When the net is used for gathering sponges the lower or heavy portion, C, of the frame may be provided with a sharp or cutting edge for detaching the sponges from the surfaces to which they may adhere, such portion of the frame, whether sharp or otherwise, acting as a scraper as well as a sinker.

If desired, the net may be provided with a shield of leather or other suitable material, the same being perforated.

What I claim as new, and desire to secure by Letters Patent, is—

A net of bag shape, for fishing sponges or the like, having attached to the mouth thereof a frame one portion of which is composed of metal or other weighty material and the remainder of wood or other buoyant material, substantially as and for the purpose described.

In testimony whereof I have hereunto set my hand and seal in the presence of two subscribing witnesses.

EDWARD ARAPIAN. [L. S.]

Witnesses:
 CHAS. WAHLERS,
 OTTO HUFELAND.